(12) United States Patent
Haltmeyer et al.

(10) Patent No.: US 9,958,197 B2
(45) Date of Patent: May 1, 2018

(54) TRAVELING HARNESS SYSTEM

(71) Applicant: WHIRLPOOL CORPORATION, Benton Harbor, MI (US)

(72) Inventors: Ronald E. Haltmeyer, Swisher, IA (US); Dean A. Martin, Solon, IA (US); Guadalupe Antonio Sanchez, Coralville, IA (US); Jose Paulo Remor, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days. days.

(21) Appl. No.: 15/433,786

(22) Filed: Feb. 15, 2017

(65) Prior Publication Data

US 2017/0160000 A1 Jun. 8, 2017

Related U.S. Application Data

(63) Continuation of application No. 13/943,827, filed on Jul. 17, 2013, now Pat. No. 9,585,474.

(51) Int. Cl.
| | |
|---|---|
| *F25D 23/04* | (2006.01) |
| *F25D 23/06* | (2006.01) |
| *F16L 3/01* | (2006.01) |
| *A47B 88/49* | (2017.01) |
| *A47B 97/00* | (2006.01) |
| *F25D 25/02* | (2006.01) |

(52) U.S. Cl.
CPC ............ *F25D 23/067* (2013.01); *A47B 88/49* (2017.01); *A47B 97/00* (2013.01); *F16L 3/01* (2013.01); *F25D 25/025* (2013.01); *A47B 2097/003* (2013.01); *A47B 2210/175* (2013.01); *F25D 2400/36* (2013.01); *F25D 2400/40* (2013.01)

(58) Field of Classification Search
CPC .... F25D 23/067; F25D 23/061; F25D 25/025; A47B 88/49; A47B 88/0414; A47B 97/00; A47B 97/003; F16L 3/01
USPC ........ 312/330.1, 401, 402, 404, 405; 62/382
See application file for complete search history.

(56) References Cited

U.S. PATENT DOCUMENTS

| | | | |
|---|---|---|---|
| 2,786,094 A | 3/1957 | Morton | |
| 3,792,189 A * | 2/1974 | Stengel | ................ H02G 3/0437 174/69 |
| 5,344,046 A | 9/1994 | Maldanis et al. | |
| 5,406,441 A | 4/1995 | Warda et al. | |
| 6,098,411 A | 8/2000 | Jeon | |
| 6,327,139 B1 | 12/2001 | Champion et al. | |
| 6,730,850 B2 | 5/2004 | Tsutsumi et al. | |
| 7,082,720 B2 | 8/2006 | Kobayashi et al. | |
| 7,097,047 B2 | 8/2006 | Lee et al. | |
| 7,197,888 B2 | 4/2007 | LeClear et al. | |

(Continued)

FOREIGN PATENT DOCUMENTS

| | | |
|---|---|---|
| JP | 2004250345 A | 9/2004 |
| KR | 100628061 B1 | 9/2006 |
| WO | 2009115277 | 9/2009 |

*Primary Examiner* — James O Hansen
(74) *Attorney, Agent, or Firm* — Nyemaster Goode, P.C.

(57) ABSTRACT

A traveling harness system is provided for an appliance to maintain electrical connections between the appliance and a drawer, while allowing the drawer to move. Wiring harness guides formed in the drawer force the wiring harness to maintain a predictable and desirable loop radius to reduce stress on the wiring harness, which prevents the wiring harness from prematurely wearing.

19 Claims, 7 Drawing Sheets

(56) References Cited

U.S. PATENT DOCUMENTS

| | | | |
|---|---|---|---|
| 7,729,132 B2 | 6/2010 | Yamamoto et al. | |
| 7,784,888 B2 | 8/2010 | Oh et al. | |
| 8,169,794 B2* | 5/2012 | Matsukawa | H02G 11/00 174/117 F |
| 8,291,816 B2 | 10/2012 | Iwamoto et al. | |
| 2002/0171335 A1 | 11/2002 | Held | |
| 2006/0087208 A1 | 4/2006 | Oh et al. | |
| 2006/0097611 A1 | 5/2006 | Kim et al. | |
| 2006/0144058 A1 | 7/2006 | Kentner et al. | |
| 2007/0274042 A1 | 11/2007 | Jackson et al. | |
| 2009/0099706 A1 | 4/2009 | Wenzel et al. | |
| 2011/0005264 A1 | 1/2011 | Lee et al. | |
| 2011/0050065 A1 | 3/2011 | Lee et al. | |
| 2011/0146333 A1 | 6/2011 | Koo et al. | |
| 2011/0181163 A1 | 7/2011 | Han et al. | |

* cited by examiner

US 9,958,197 B2

TRAVELING HARNESS SYSTEM

CROSS REFERENCE TO RELATED APPLICATIONS

This application is a continuation of U.S. patent application Ser. No. 13/943,827, filed Jul. 17, 2013, entitled "TRAVELING HARNESS SYSTEM," which is hereby incorporated by reference in its entirety.

FIELD

This disclosure relates to appliances. In particular, this disclosure is drawn to refrigerators and/or freezers having drawers with integrated user interfaces.

BACKGROUND

Appliances, such as refrigerators, sometimes include drawer type doors, or drawers disposed within the appliance. If an appliance drawer includes electrical devices, such as lights, displays, controls, etc., it is desirable to route power and signals to the electrical devices. Typically, power and signals are delivered using wiring harnesses or cable assemblies. Since a drawer, and any associated wiring harnesses, will be frequently opened and closed, the wiring harnesses tend to wear, due to the harness flexing and rubbing on other objects.

SUMMARY

An appliance is provided including a cabinet, a drawer movable between an open position and a closed position, a wiring harness between the drawer and a wall of the cabinet, a first wiring harness guide coupled to the drawer, the first wiring harness guide being configured to orient the wiring harness at a desired angle, relative to the drawer, and a second wiring harness guide coupled to the cabinet to guide the wiring harness to a desired geometry when the drawer is moved.

Another embodiment provides an appliance including a cabinet, a drawer movable between an open position and a closed position, a conduit coupled to the drawer and extending generally parallel to a wall of the cabinet, a cable assembly coupled to the cabinet and to the drawer, the cable assembly being routed at least partially through the conduit, and a cable assembly guide coupled to the drawer and disposed proximate an end of the conduit, the cable assembly guide being configured to orient the wiring harness away from the wall of the cabinet.

Another embodiment provides a method of delivering power and signals to a drawer of an appliance including coupling a first end of a cable assembly to a wall of the appliance, coupling a second end of the cable assembly to the drawer such that a length of the cable assembly extends between the drawer and the wall, and coupling a cable assembly guide to the drawer to control the orientation of the cable assembly extending between the drawer and the wall, wherein the cable assembly guide orients the cable assembly away from the wall in the proximity of the cable assembly guide.

Other features and advantages of the present disclosure will be apparent from the accompanying drawings and from the detailed description that follows below.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Generally, the present disclosure relates to a traveling harness system for appliances such as refrigerators and freezers. A traveling harness is used to provide signals and/or power to a user interface integrated with a drawer in an appliance. For example, some refrigerators include a freezer drawer or food storage drawers that include a user interface (e.g., indicators, displays, controls, etc.). A wiring harness is coupled between the refrigerator cabinet harness and the drawer user interface to provide signals and/or power to the user interface. When the drawer is opened and closed, the wiring harness bends to maintain the electrical connections between the refrigerator and drawer, while allowing the drawer to move. To increase the reliability of the refrigerator, wiring harness guides force the wiring harness to maintain a predictable and desirable loop radius to reduce stress on the harness, which prevents the wiring harness from prematurely wearing. In one example, the wiring harness guide is coupled to the drawer at the point where the wiring harness is coupled to the drawer, and forces the wiring harness to extend away from the refrigerator wall, at a specific angle. In another example, a second wiring harness guide is coupled to the refrigerator wall to guide the opposite end of the wiring harness to a desired radius. By keeping the wiring harness at an optimal radius, stresses on the wiring harness are minimized when the drawer is opened and closed.

The following disclosure will be described in the context of wiring harnesses in appliances such as refrigerators and freezers. It shall be understood that the concepts described also apply to other appliances, furniture, and other applications.

Figure 1:
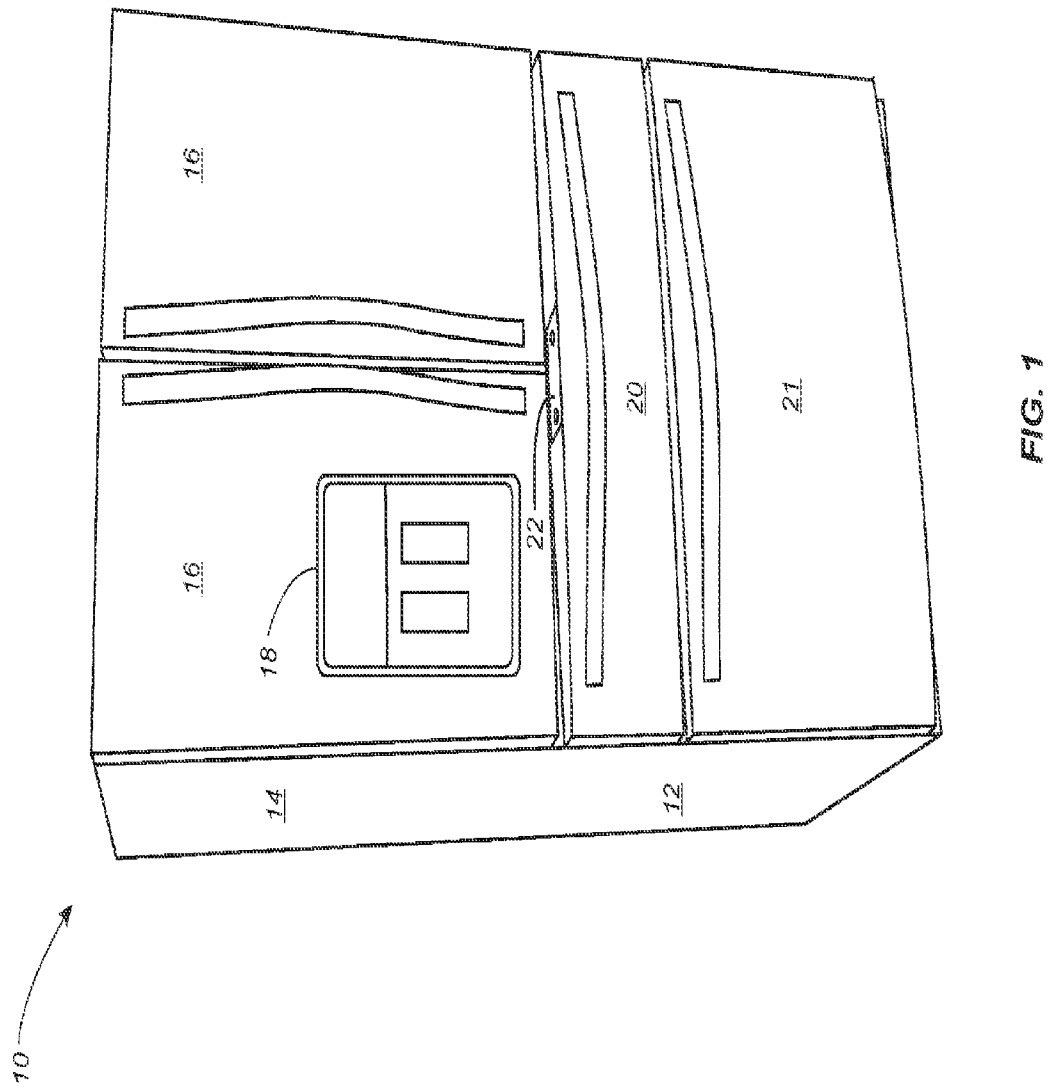
FIG. 1 is an isometric view of a refrigerator having a drawer with a traveling harness.

FIG. 1 is an isometric view of a refrigerator 10 that may be used with a traveling harness of the present disclosure. In the example of FIG. 1, the refrigerator 10 has a lower freezer compartment (pantry 12) and an upper fresh food compartment 14. Other configurations are also possible. The fresh food compartment 14 includes side-by-side doors 16 and a water and ice dispenser 18. The pantry 12 includes an upper door 20 and a lower door 21. The pantry 12 and doors 20 and 21 form a drawer type freezer compartment. The upper door 20 includes a user interface 22 disposed on the upper edge of the door 20. The user interface 22 may include an LCD display, LED indicators, buttons, etc. The user interface could also be disposed on the front surface of the door 20. One or more lights (not shown) may be used to illuminate the contents of the pantry 12.

Figure 2:
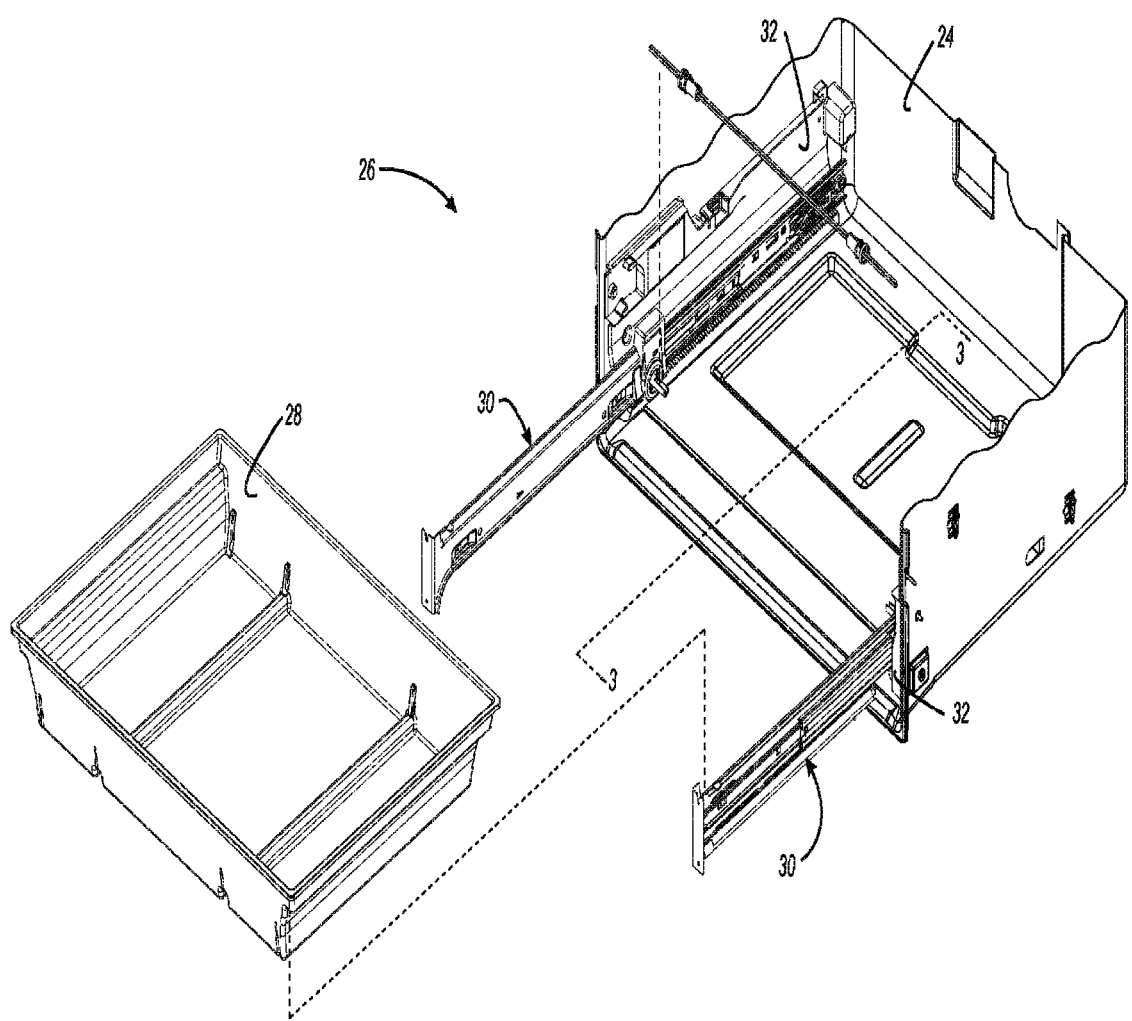
FIG. 2 is an exploded partial isometric view of a drawer of a refrigerator.

The configuration of the pantry 12 and doors 20 and 21 may take on any desired form. FIGS. 2-9 illustrate one example of a drawer-style pantry 12. In the example shown in FIGS. 2-9, the refrigerator 10 includes a liner 24 that lines the interior surfaces of the refrigerator 10 and forms interior walls of the refrigerator 10. FIG. 2 is an exploded view of a drawer 26 that is part of the pantry 12. The drawer 26 includes a tray 28 that is used to hold food that is stored in the pantry 12. For clarity, door 20 is not shown. The tray 28 is mounted to a pair of opposing rails 30 that are movably coupled to left and right pantry adapters 32, which are mounted to the liner 24 of the refrigerator 10. The rails 30 allow the tray 28 to slide out when a user pulls the handle of the pantry door 20. The example of FIG. 2 shows various details of the liner 24, rails 30, and tray 28 that are not essential to the disclosure described below.

Figure 3:
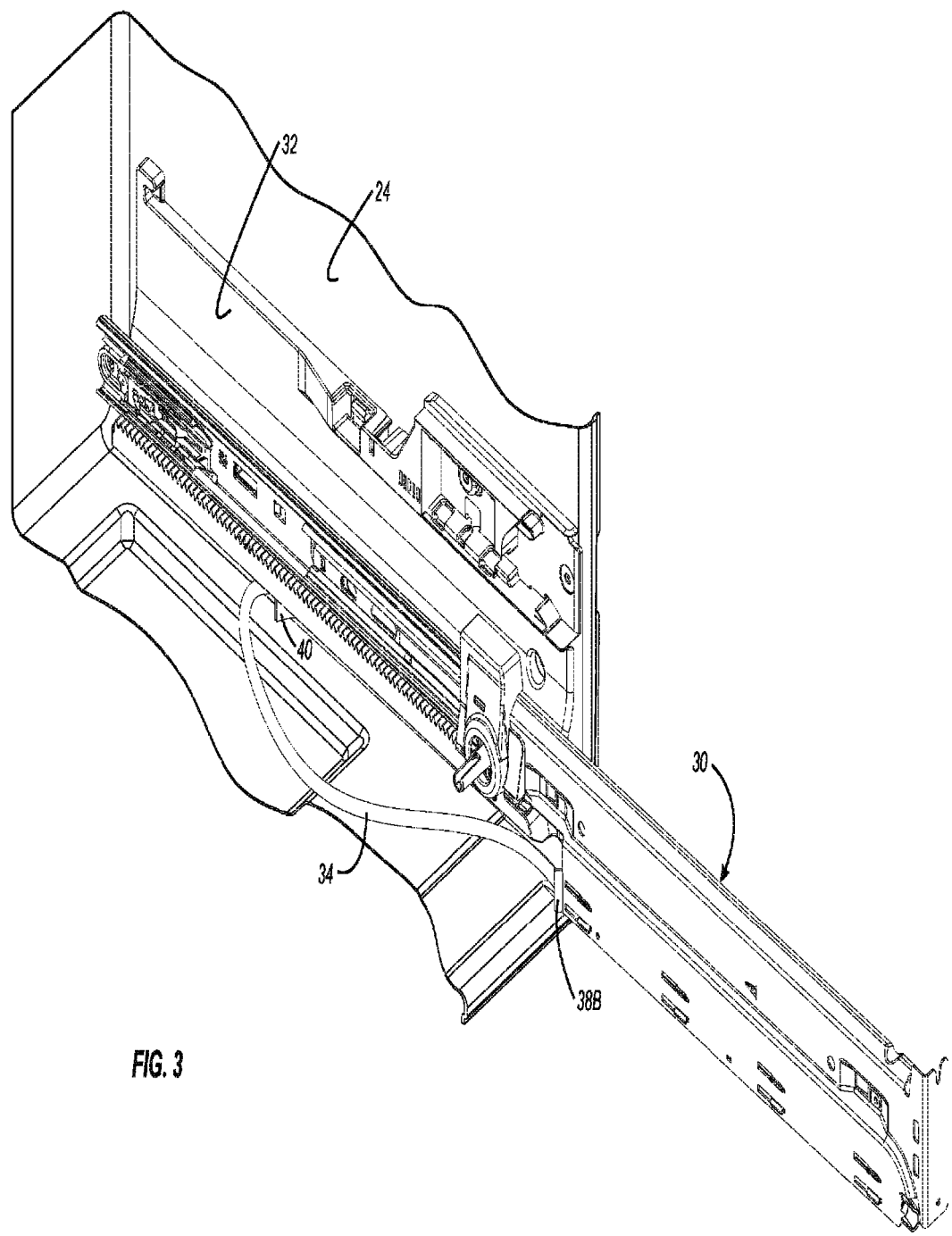
FIG. 3 is an enlarged partial isometric view taken from the perspective of line 3-3 of FIG. 2
Figure 4:
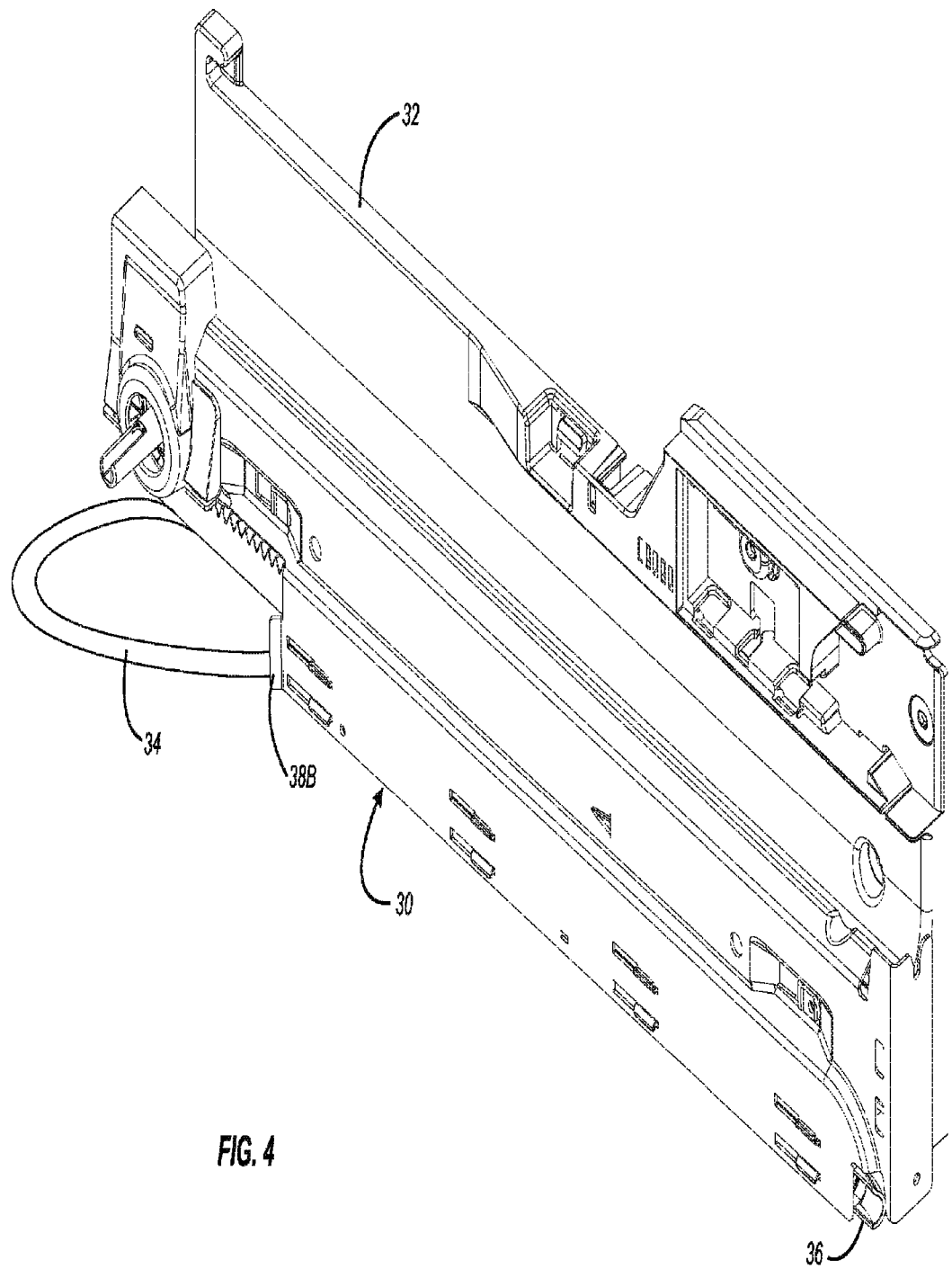
FIG. 4 is an isometric view of a pantry adapter and rail in the closed position.

In the example shown in FIGS. 2-9, the user interface 22 of the pantry door 20 is electrically coupled to the refrigerator 10 via a wiring harness, or cable assembly. In the examples shown, the wiring harness is disposed on the right side of the drawer 26, and is not shown in FIG. 2. FIGS. 3 and 4 are isometric view of the right hand rail 30 shown in FIG. 2, viewed from the opposite side of FIG. 2. FIG. 3 shows a partial view of the liner 24, pantry adapter 32, and rail 30 taken from the perspective of line 3-3 of FIG. 2. The tray 28 and pantry door 20 are not shown. In FIG. 3, the rail 30 is in the open position. FIG. 3 also shows a wiring harness 34 that is coupled to the rail 30 and the pantry adapter 32. The wiring harness 34 provides an electrical connection (for signals and/or power) between the refrigerator 10 and the user interface 22 of the pantry door 20. If desired, a user can unplug the wiring harness 34 in order to remove the drawer 26.

FIG. 4 shows the pantry adapter 32 and rail 30 in the closed position. The liner 24 is not shown in FIG. 4. As with FIG. 3, the wiring harness 34 is coupled to the rail 30 and the pantry adapter 32. As shown in FIGS. 3 and 4, the wiring harness 34 moves from an extended orientation (FIG. 3) when the drawer is in the open position to a coiled position (FIG. 4) when the drawer is in the closed position. As described in detail below, the orientation of the wiring harness 34 is controlled to minimize wear on the wiring harness 34. As shown in FIGS. 3 and 4, the wiring harness 34 is oriented in a horizontal plane in both the open and closed positions.

Figure 5:
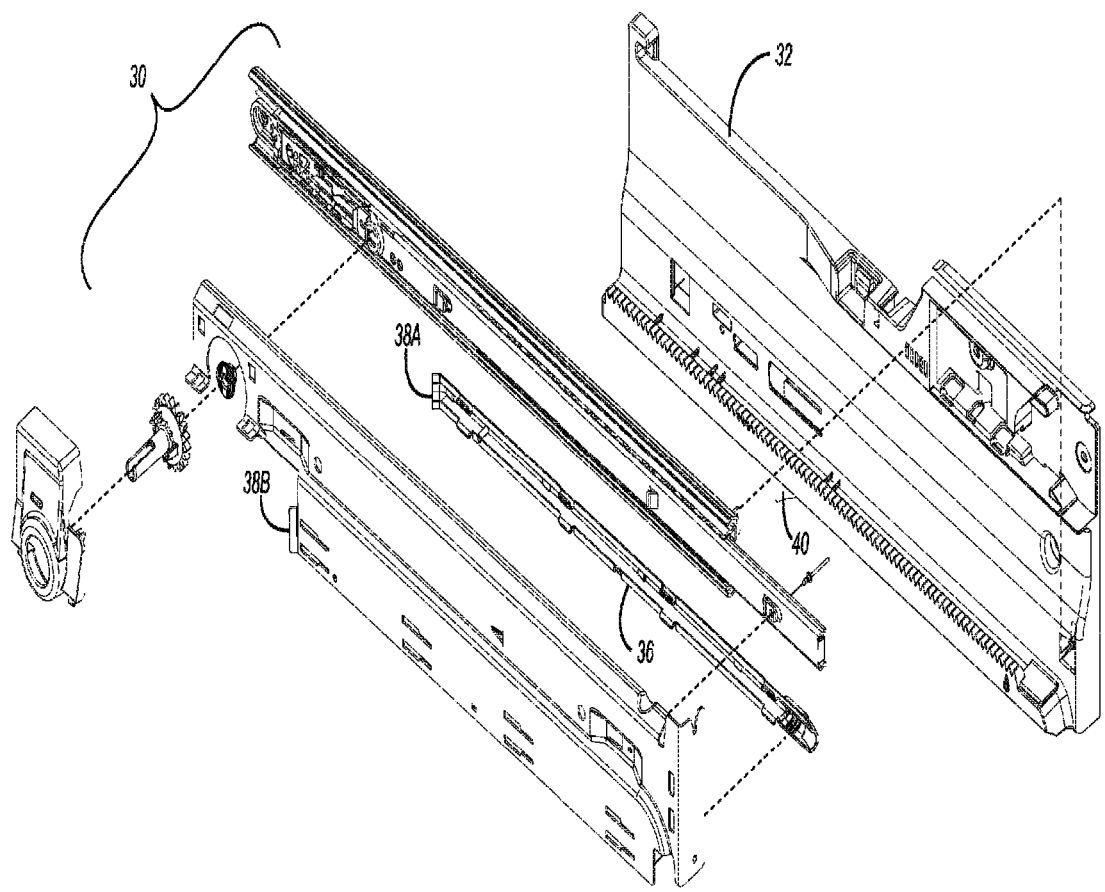
FIG. 5 is an exploded isometric view of the pantry adapter and rail shown in FIG. 4.

FIG. 5 is an exploded isometric view of the pantry adapter 32 and rail 30 shown in FIG. 4 (in the closed position). The rail 30 has a conduit 36 that secures the wiring harness 34 to the rail 30 along most of the length of the rail 30. At the rear end (the end toward the back of the refrigerator 10) of the conduit 36, the conduit 36 is angled outward (relative to the liner 24 and refrigerator wall) to form a part of a wiring harness guide 38 (shown as wiring harness guide 38A). An angled portion 38B of the rail 30 forms the remaining part of the wiring harness guide 38. The wiring harness guide 38 forces the wiring harness 34 to be oriented at a desired angle, relative to the rail 30, to maintain a specific, desired loop radius.

Figure 6:
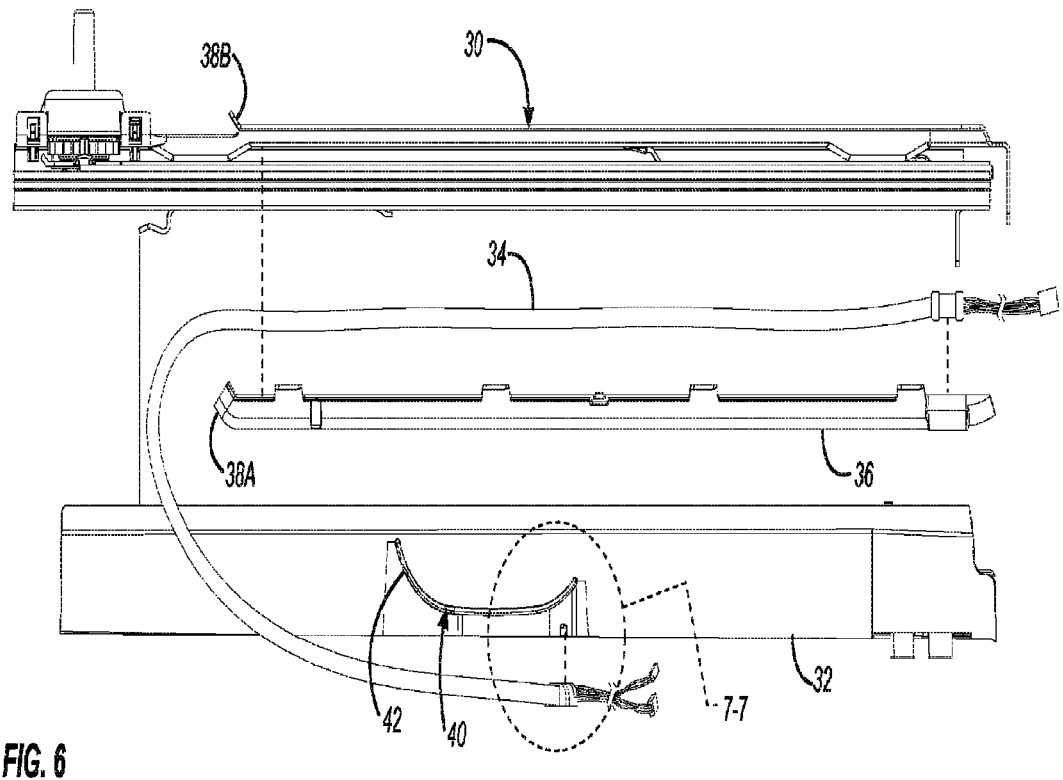
FIG. 6 is an exploded bottom view of a pantry adapter, rail, conduit, and wiring harness.

FIG. 6 is an exploded bottom view of the pantry adapter 32, rail 30, conduit 36, and wiring harness 34. As shown, the wiring harness guide 38 (formed by 38A and 38B) is angled outward, relative to the pantry adapter 32 (and thus, the wall of the refrigerator 10) to guide the orientation of the wiring harness 34. FIG. 6 also shows a second wiring harness guide 40 that is formed on the pantry adapter 32. the wiring harness guide 40 has a curved surface 42 that has a guide geometry that helps keep the wiring harness 34 within a specific desired loop radius.

Figure 7:
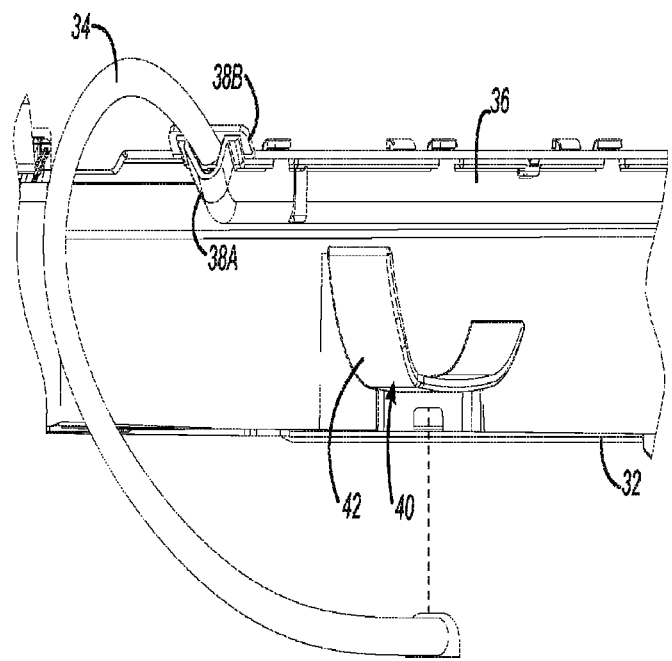
FIG. 7 is an enlarged partial view taken along lines 7-7 of FIG. 6.

FIG. 7 is an enlarged partial view taken along lines 7-7 of FIG. 6. The view of FIG. 7 is taken at a slight angle from the rear of the refrigerator to help illustrate the orientation of the wiring harness guides 38 and 40.

Figure 8:
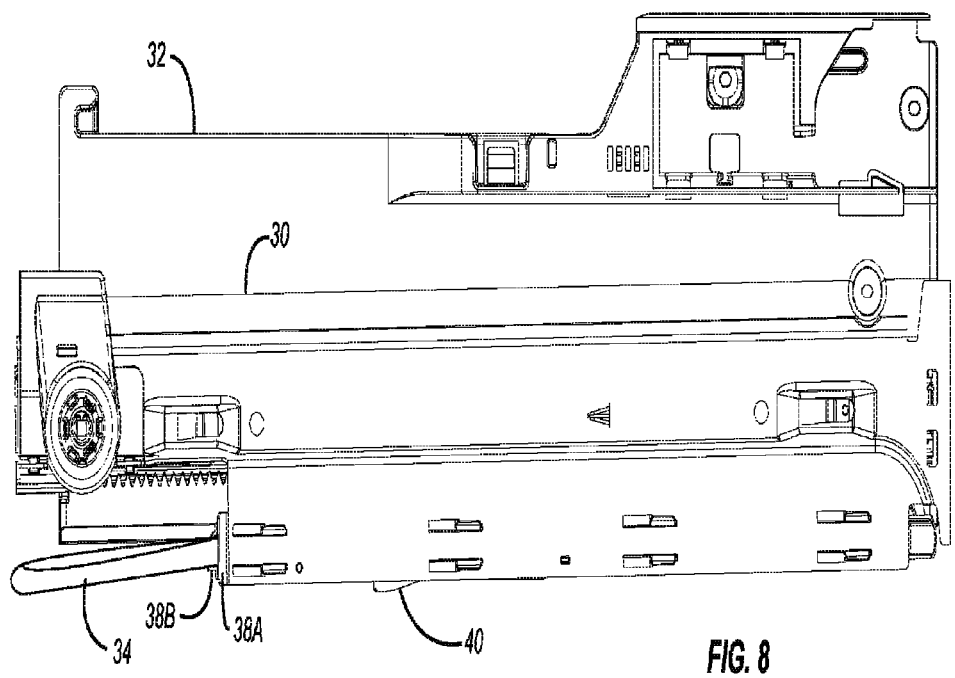
FIG. 8 is a side view of the pantry adapter, rail, and wiring harness from the perspective of the interior of the drawer.
Figure 9:
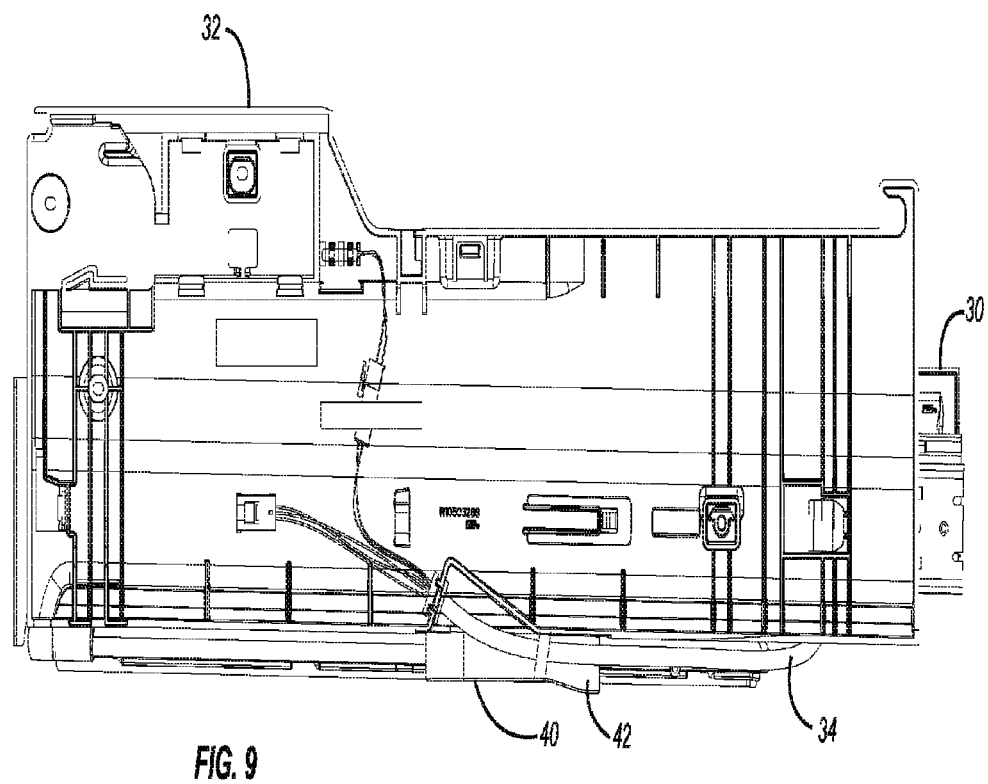
FIG. 9 is a side view of the pantry adapter, rail, and wiring harness from the perspective of the exterior of the drawer.

FIGS. 8 and 9 are side views of the pantry adapter 32, rail 30, and wiring harness 34 shown in FIG. 4 (the closed position). FIG. 8 is a side view of the pantry adapter 32, rail 30, and wiring harness 34 from the perspective of the interior of the drawer 26. As shown, the wiring harness 34 extends from the rail 30 (guided by the wiring harness guide 38), forming a loop, and is coupled at the opposite end to the pantry adapter 32. FIG. 9 is an opposite side view of the pantry adapter 32, rail 30, and wiring harness 34 from the perspective of the exterior of the drawer 26. As shown, the wiring harness 34 is coupled to the pantry adapter 32 (i.e., at the side of the refrigerator) and is guided by the wiring harness guide 40. The combination of the wiring harness guides 38 and 40 cause the wiring harness 34 to maintain a specific, desired loop radius during the operation of the pantry drawer to minimize stress on the wiring harness 34, increasing the lifespan of the wiring harness 34.

In the preceding detailed description, the disclosure is described with reference to specific exemplary embodiments thereof. Various modifications and changes may be made thereto without departing from the broader spirit and scope of the disclosure as set forth in the claims. The specification and drawings are, accordingly, to be regarded in an illustrative rather than a restrictive sense.

What is claimed is:

1. An appliance comprising:
   a cabinet;
   a drawer movable between an open position and a closed position;
   a wiring harness disposed in a conduit formed between the drawer and a wall of the cabinet the wiring harness extending from a rear end of the conduit to form a loop portion that is loop-shaped when the drawer is in the closed position;
   a first wiring harness guide extends from the conduit at the rear end of the conduit and toward the drawer and the first wiring harness guide is located between the drawer and the wall of the cabinet, the first wiring harness guide orients the wiring harness away from the wall of the cabinet; and
   a second wiring harness guide coupled to the cabinet to guide the wiring harness to a desired geometry when the drawer is moved wherein the wiring harness at least partially extends along a curved surface of the second wiring harness guide and an angled end of the first wiring harness guide; and
   wherein the loop portion of the wiring harness is oriented in a substantially horizontal plane.

2. The appliance of claim 1, wherein the wiring harness is coupled to a side wall of the cabinet and wherein the angled end of the first wiring harness guide is angled away from the side wall of the cabinet at approximately 45 degrees.

3. The appliance of claim 1 further comprising a user interface disposed on the drawer, wherein the user interface is electrically connected to the wiring harness and wherein the wiring harness extends through the rear end of the conduit that faces a back wall of the cabinet.

4. The appliance of claim 1, wherein the wiring harness moves from an extended orientation when the drawer is in an open position to a coiled orientation when the drawer is in a closed position.

5. An appliance comprising:
a cabinet;
a drawer movable between an open position and a closed position;
a conduit coupled to the drawer and extending generally parallel to a wall of the cabinet;
a wiring harness coupled to a side wall of the cabinet and to the drawer, wherein the wiring harness is routed through the conduit and extends from the conduit at a rear end of the conduit to form a loop portion that is loop shaped when the drawer is in the closed position; and
a first wiring harness guide located between the drawer and the wall of the cabinet and extending from the conduit toward the drawer proximate the rear end of the conduit, wherein the first wiring harness guide forces a portion of the wiring harness away from the wall of the cabinet in the closed position to help maintain the loop portion at a desired loop radius and wherein the wiring harness at least partially extends along a curved surface of a second wiring harness guide and an angled end of the first wiring harness guide.

6. The appliance of claim 5, wherein the appliance is a refrigerator and wherein the drawer has a rail with an angled end and the first wiring harness guide has an angled end.

7. The appliance of claim 5, wherein the second wiring harness guide is coupled to the cabinet to guide the wiring harness to a desired geometry when the drawer is moved.

8. The appliance of claim 7, wherein the wiring harness is coupled to a side wall of the cabinet proximate to the second wiring harness guide and wherein the first wiring harness guide is shaped such that a portion of the wiring harness extends away from the side wall of the cabinet at approximately a 45 degree angle.

9. The appliance of claim 5, wherein the loop portion is substantially oriented in a same horizontal plane.

10. The appliance of claim 5 further comprising a user interface disposed on the drawer, wherein the user interface is electrically connected to the wiring harness.

11. The appliance of claim 5, wherein the wiring harness moves from an extended orientation when the drawer is in an open position to a coiled orientation when the drawer is in a closed position.

12. A refrigerator comprising:
a refrigerator cabinet;
a refrigerator drawer movable between an open position and a closed position;
a wiring harness disposed in a conduit formed between the refrigerator drawer and a side wall of the refrigerator cabinet, the wiring harness extending from an end of the conduit to form a loop portion;
a first wiring harness guide located between the refrigerator drawer and the side wall of the refrigerator cabinet, the first wiring harness guide having an angled portion angled away from a pantry adapter at an angle between 30 degrees and 60 degrees and configured to orient the wiring harness away from the side wall of the refrigerator cabinet to help maintain the loop portion at a desired loop radius; and
a second wiring harness guide formed on the pantry adapter that is coupled to the refrigerator cabinet, wherein the second wiring harness guide keeps the wiring harness within a loop radius when the refrigerator drawer is moved and the loop portion is a loop proximate the rear of the refrigerator cabinet when the refrigerator drawer is in the closed position; and
wherein the wiring harness at least partially extends along a curved surface of the second wiring harness guide and the angled portion of the first wiring harness guide and wherein the loop portion of the wiring harness is oriented in a substantially horizontal plane.

13. The refrigerator of claim 12, wherein the wiring harness is coupled to a side wall of the refrigerator cabinet.

14. The refrigerator of claim 13 further comprising a user interface disposed on the refrigerator drawer, wherein the user interface is electrically connected to the wiring harness.

15. The refrigerator of claim 12 further comprising a user interface disposed on the refrigerator drawer, wherein the user interface is electrically connected to the wiring harness and receives power and signals from the wiring harness.

16. The refrigerator of claim 12, wherein the loop portion of the wiring harness is oriented in the substantially horizontal plane in both an open position and a closed position.

17. The refrigerator of claim 12, wherein the wiring harness is coupled to a rail and the pantry adapter.

18. The refrigerator of claim 12, wherein the pantry adapter is mounted to a liner of the side wall of the refrigerator cabinet.

19. The refrigerator of claim 12, wherein the wiring harness moves from an extended orientation when the refrigerator drawer is in an open position to a coiled orientation when the refrigerator drawer is in a closed position.

* * * * *